(12) United States Patent
Whitaker et al.

(10) Patent No.: US 8,899,559 B2
(45) Date of Patent: Dec. 2, 2014

(54) PNEUMATIC OPERATED FORE/AFT VIBRATION ISOLATOR LOCKING DEVICE

(75) Inventors: Robert Joseph Whitaker, Vonore, TN (US); Gordon Dale Cooley, Morristown, TN (US)

(73) Assignee: CVG Management Corporation, New Albany, OH (US)

( * ) Notice: Subject to any disclaimer, the term of this patent is extended or adjusted under 35 U.S.C. 154(b) by 41 days.

(21) Appl. No.: 13/407,215

(22) Filed: Feb. 28, 2012

(65) Prior Publication Data
US 2012/0222930 A1  Sep. 6, 2012

Related U.S. Application Data

(60) Provisional application No. 61/447,187, filed on Feb. 28, 2011.

(51) Int. Cl.
*B60G 11/02* (2006.01)
*F16F 7/08* (2006.01)

(52) U.S. Cl.
CPC ........................................ *F16F 7/08* (2013.01)
USPC ............................ 267/48; 297/303.1; 297/131

(58) Field of Classification Search
CPC .......... F16F 1/18; F16F 1/22; A47C 1/03266; A47C 7/445; A47C 7/462
USPC ......... 248/157, 550, 560, 576, 578, 592, 594, 248/610, 618, 619, 629, 631, 636, 638, 248/561; 297/374, 300.2, 302.1, 303.1; 267/23, 48, 64.11, 64.26, 117, 121, 267/131, 136, 142, 143, 151, 160; 188/378–380; 269/24, 254 CS; 254/93 R
See application file for complete search history.

(56) References Cited

U.S. PATENT DOCUMENTS

| | | | | | |
|---|---|---|---|---|---|
| 975,827 | A | * | 11/1910 | Busch | 267/132 |
| 1,912,451 | A | * | 6/1933 | Hibbard | 248/578 |
| 2,597,252 | A | * | 5/1952 | McKinney | 267/133 |
| 4,351,556 | A | * | 9/1982 | Worringer | 296/63 |
| 4,433,833 | A | * | 2/1984 | Tabe et al. | 267/218 |
| 4,703,974 | A | * | 11/1987 | Brauning | 297/285 |
| 5,129,633 | A | * | 7/1992 | Walton et al. | 267/45 |
| 5,294,085 | A | | 3/1994 | Lloyd et al. | |

(Continued)

FOREIGN PATENT DOCUMENTS

JP    02279415 A  * 11/1990   .......... B60G 17/027

OTHER PUBLICATIONS

Copenheaver, Blaine R. Notification of Transmittal of the International Search Report and the Written Opinion of the International Searching Authority, or the Declaration, issued May 31, 2012.

*Primary Examiner* — Bradley King
*Assistant Examiner* — Stephen Bowes
(74) *Attorney, Agent, or Firm* — Kegler Brown Hill & Ritter; James J. Pingor

(57) ABSTRACT

A pneumatic fore-aft vibration isolator lock system (and method) is provided. The innovation provides a locking action through the use of pneumatically-actuated spring pressure to lock or unlock the isolation system. In one aspect, to unlock, air pressure is applied and the spring pressure is overridden by the air pressure. By overriding the spring pressure, plates are moved thereby unlocking the isolator. The system can allow for one touch, fingertip locking and unlocking of the fore/aft isolation system.

14 Claims, 6 Drawing Sheets

(56) References Cited

U.S. PATENT DOCUMENTS

| | | | |
|---|---|---|---|
| 5,452,868 A * | 9/1995 | Kanigowski | 244/122 R |
| 5,566,928 A * | 10/1996 | Lee | 267/31 |
| 6,719,258 B2 | 4/2004 | Bryngelson et al. | |
| 7,152,839 B2 | 12/2006 | Mullinix et al. | |
| 7,249,780 B1 * | 7/2007 | Wilson | 280/676 |
| 7,631,881 B2 * | 12/2009 | Broemeling | 280/5.521 |

* cited by examiner

PNEUMATIC OPERATED FORE/AFT VIBRATION ISOLATOR LOCKING DEVICE

CROSS-REFERENCE TO RELATED APPLICATIONS

This application claims the benefit of U.S. Provisional Patent application Ser. No. 61/447,187 entitled PNEUMATIC ISOLATOR LOCK filed on Feb. 28, 2011. The entireties of the above-noted applications are incorporated by reference herein.

ORIGIN

The innovation relates to vehicle seats and more particularly to vehicle seating assemblies that isolate occupants from vibrations carried through the vehicle structure.

BACKGROUND

Commercial vehicles, such as long-haul trucks, often employ suspension systems which differ from passenger vehicles in their construction and response to vibration. Oftentimes, suspension systems in commercial vehicles are specially designed for the intended use of the commercial vehicle. Large trucks, for example, are designed for and capable of handling heavy loads which affects suspension design and performance. As a result, trade-offs arise between work capability of a commercial vehicle and protecting occupants (e.g., driver, passenger) from demonstrated medically harmful vibrations. Because the main purpose of the truck is to transport loads, the decision is usually made to favor the performance capability of the commercial vehicle in lieu of protecting the occupants from vibrations.

As a result, operators or drivers of commercial vehicles, sometimes experience aggravated discomfort and fatigue arising from exposure to excessive vehicle vibrations. Efforts have been, and continue to be, made to provide some sort of amelioration of vibration-induced problems. Because most commercial vehicles are only occupied by a driver, these vibration containment efforts are often associated with the seating for the driver, and less often directed to the other vehicle occupants. A goal of most vibration containment systems is to selectively absorb vibrational energy and to channel or dissipate unwanted energy away from the driver's anatomy.

Usually, vibrations arriving at a driver's seat bear directional characteristics, thus, improvements to seating designs take advantage of this fact by restricting seating improvements to a particular type of vibration characteristic. For example, many seating design improvements have been directed to enhancements in providing fore and aft (e.g., horizontally linear) isolation and vertical isolation. One design concern is to provide sufficient vibration isolation within the footprint and framework of existing seating components, for example, without significantly raising the height of an operator's seat which may require subsequent modification to a passenger's seat.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a pneumatic vibration isolator lock. Conventional art provides for a purely mechanical lock for fore-aft isolators in truck seats. This innovation provides a locking action through the use of pneumatically-controlled spring pressure to lock the system. In one aspect, to unlock, air pressure is applied and the spring pressure is overridden by the air pressure. In another aspect, the air pressure/volume can be manually adjusted by the operator to provide a partial lock. The proposed system can allow for one touch, fingertip locking and unlocking of the fore/aft isolation system. Alternative, conventional, systems require some mechanical lever/latching action.

In another aspect, the innovation A vibration isolation system for a seat assembly comprising an air supply component and a vibration isolator component that receives air from the air supply component and locks or unlocks a vibration isolation device based upon an amount of air pressure.

In yet another aspect, the innovation provides a vibration isolation lock device for a seat assembly is provided and includes a plurality of restrictor plates, a spring in communication with the plurality of restrictor plates; and a pneumatic piston mechanism communicating with the spring. The plurality of restrictor plates restricts movement of a movable seat frame with respect to a fixed seat frame based on an amount of air pressure from the piston mechanism.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
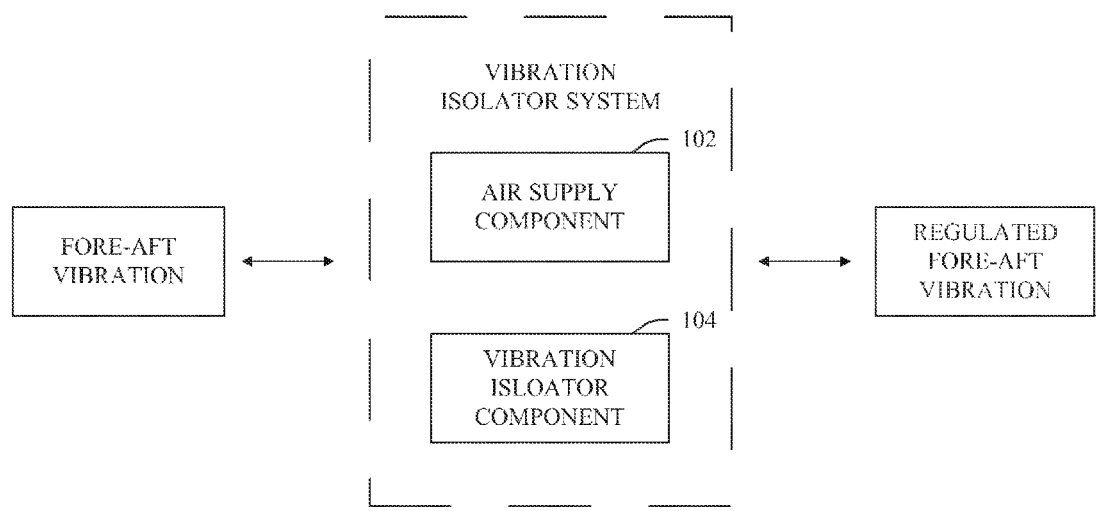
FIG. 1 illustrates an example block diagram of a pneumatic isolator lock system in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein (e.g., thickness), it is to be understood that the features, functions and benefits of the innovation can employ characteristics that vary from those described herein. These alternatives are to be included within the scope of the innovation and claims appended hereto.

Referring initially to the drawings, FIG. 1 illustrates an example block diagram of a vibration isolator lock system 100 in accordance with aspects of the innovation. In operation, the system of FIG. 1 can facilitate pneumatic operation of a fore-aft vibration isolator locking device frequently used in seating systems of long haul trucks. As will be appreciated, fore-aft vibration isolation is a standard feature in North American class 8 truck seats, as well as many other seating systems worldwide.

Generally, the system 100 can include an air supply component 102 and a vibration isolator component 104. In operation, pressurized air can be provided by the air supply component 102 to the vibration isolator component 104. As will be shown and described further below, the presence of pressurized air can move a piston, pivot an arm, and compress a spring which compresses plates thereby effecting isolation lock and unlock. While the system 100 employs air to compress and hold plates, it will be understood that varying pressures can effectively isolate vibrations that vary in intensity. These and other aspects will be better understood upon a review of the figures that follow.

Figure 2:
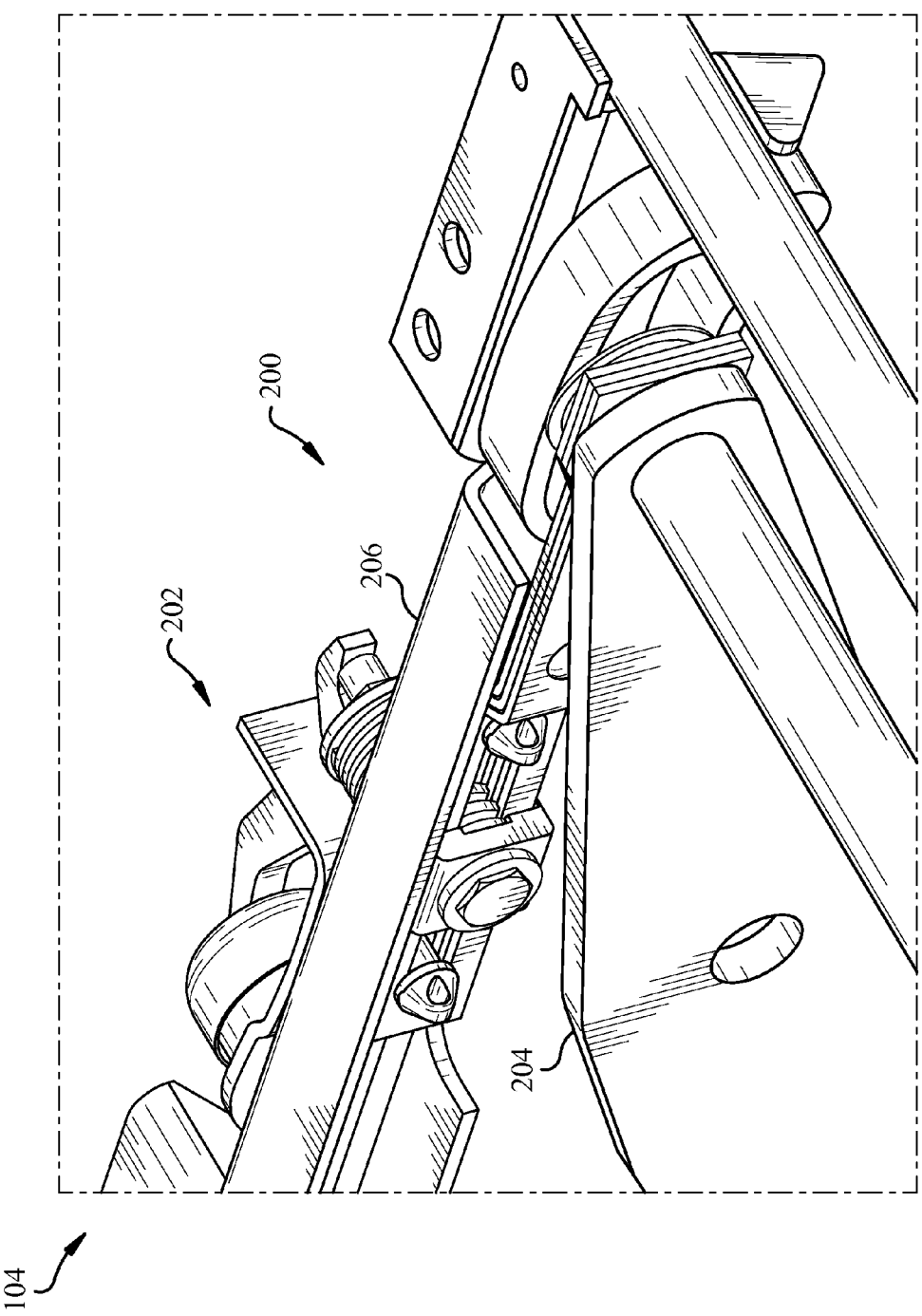
FIG. 2 illustrates a perspective view of a suspension base assembly for a seat assembly incorporating a vibration isolation system in accordance with aspects of the innovation.

FIG. 2 illustrates an example embodiment of a vibration isolator component 104 including a suspension base assembly 200 for a seat assembly (not shown) that incorporates a vibration isolator lock device 202 in accordance with aspects of the innovation. The suspension base assembly 200 includes a first or fixed part (fixed frame) 204 and a second or movable part (movable frame) 206. The movable part 206 moves with respect to the fixed part 204 by approximately +/−1 inch. The motion of the movable part 206 in relation to the fixed part 204 is substantially on a same plane. The vibration isolator lock device 202 attaches to the movable part 206 of the suspension base assembly 200, as shown in FIG. 2. The seat assembly (not shown) attaches to the movable part 206. Thus, the vibration isolator lock device 202 isolates any fore/aft vibration from a driver of the vehicle.

Conventionally, various types of mechanical latches and the like have been used to establish isolation lock. Contrary to conventional systems, the proposed system (e.g., system of FIG. 1) provides for pneumatic locking of the system, allowing additional flexibility in controlling the lock actuation. Additionally, as will be understood upon a review of the figures and description provided herein, the proposed system allows manual (or automatic) control of the air pressure. This provides the ability of the system to partially lock, thus giving the effect of a locked system, but allowing movement during a major fore/aft vibration event. In other words, the amount of air (e.g., pressure) can be regulated, thereby limiting some, but not all, of the fore/aft movements and vibration.

In other aspects, a user can pre-program a desired isolation pressure thereby the pressure can be auto-regulated (e.g., via a controller) to provide a desired effect. It will be understood that most any switching or programming system can be employed to regulate the pressure in the pneumatic isolation system of the innovation.

Figure 3:
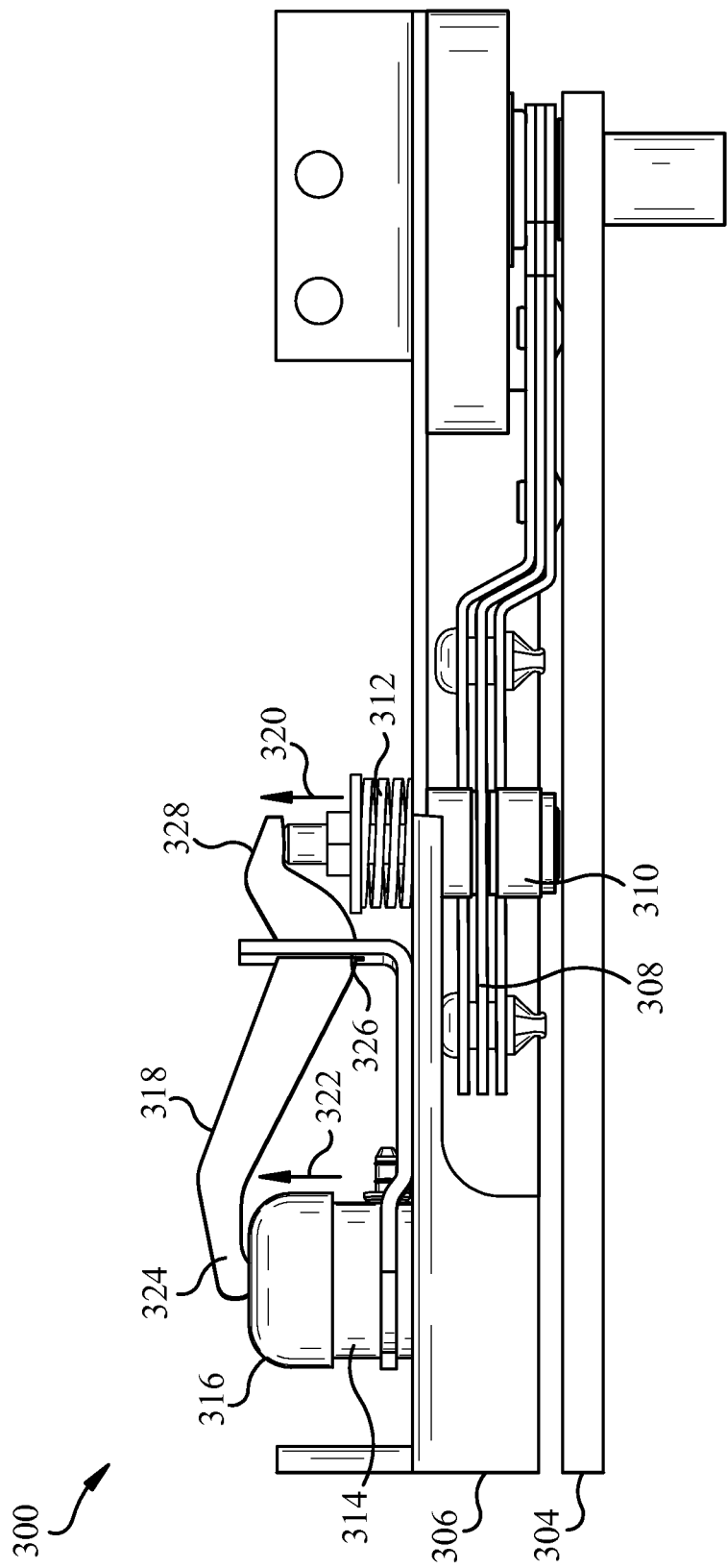
FIG. 3 illustrates a top view illustrating the configuration of the vibration isolation system in accordance with aspects of the innovation.
Figure 4:
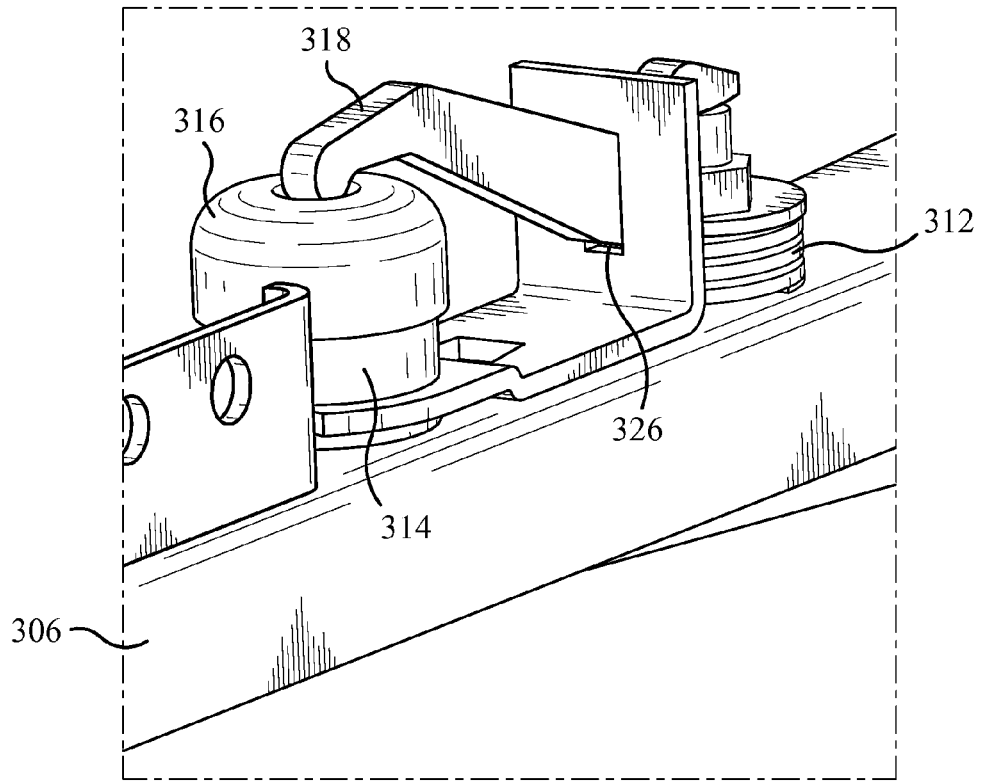
FIGS. 4-6 are perspective close-up views of a short stroke air cylinder with a piston, a pivot arm, and a spring in accordance with aspects of the innovation.

Referring to FIG. 3, a partial top view of an example suspension base 300 incorporating an example a vibration isolator lock device 302 is illustrated in accordance with an aspect of the innovation. The suspension base includes a first (fixed) frame 304 and a second (movable) frame 306. The vibration isolator lock device 302 is mounted to the movable frame 306, which moves with respect to a fixed frame 304. The vibration isolator lock device 302 includes multiple restrictor plates 308 having multiple spacers 310 disposed between each of the multiple restrictor plates 308, a spring 312, and a piston mechanism comprising a short stroke air cylinder 314 including a piston 316, and a pivot arm 318 that provides a communication between the piston 316 and the spring 312.

The restrictor plates 308 provide a connection between the fixed part 304 and the movable part 306. Thus, restrictor plates 308 restrict the motion of the movable part 306 with respect to the fixed part 304. Specifically, when no or little air pressure is supplied by the air cylinder 314, the spring 312 is biased in a direction indicated by arrow 320 (away from the restrictor plates 308) and, thus clamps the multiple spacers 310 to the restrictor plates 308. The spring 312 clamps with sufficient force to lock (restrict movement) the movable part 306 with respect to the fixed part 304. Thus, the vibration isolation system 100 is in a locked state, which indicates that the movable part 306 is not movable with respect to the fixed part 304, when there is little or no air pressure supplied by the air cylinder 314.

Conversely, when the air cylinder 314 supplies air to actuate the vibration isolation device 302, the vibration isolation system 100 is in an unlocked state. Specifically, when the air cylinder 314 supplies air, the piston 316 extends in a direction indicated by the arrow 322. The piston 316 pushes on a first end 324 the pivot arm 318, which in turn pivots about a point 326. A second end 328 of the pivot arm 318 in turn pushes on the spring 312 and forces the spring in a direction opposite of the direction of the arrow 320. The compression spring 312 unlocks the spacers 310 from the restrictor plates 308, thereby unlocking the vibration isolation system 100. In the unlocked state, the movable part 306 is allowed to move with respect to the fixed part 304, thereby allowing the vibration isolation system 100 to isolate any fore/aft vibrations from the driver.

Figure 5:
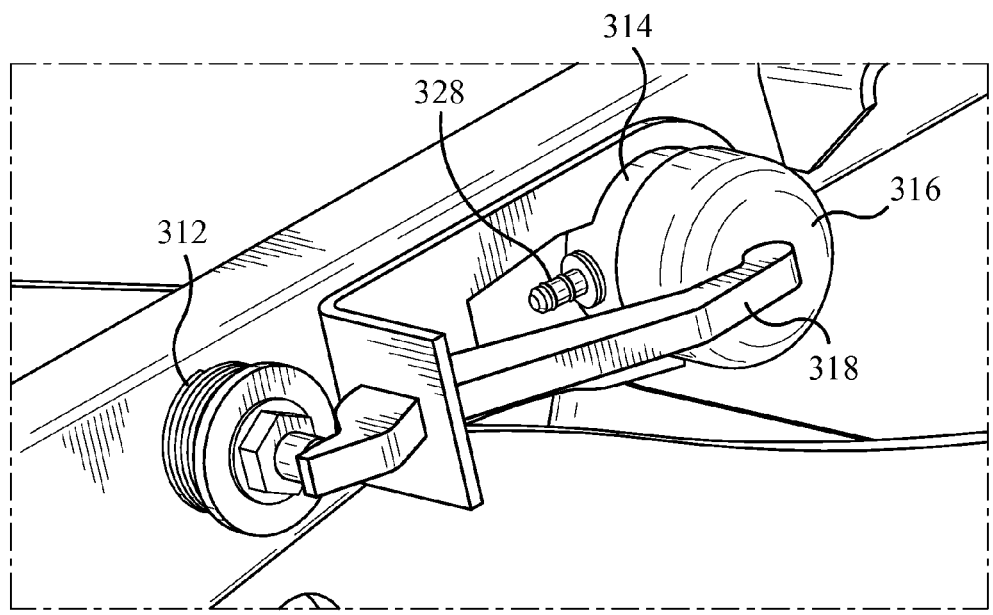
Figure 6:
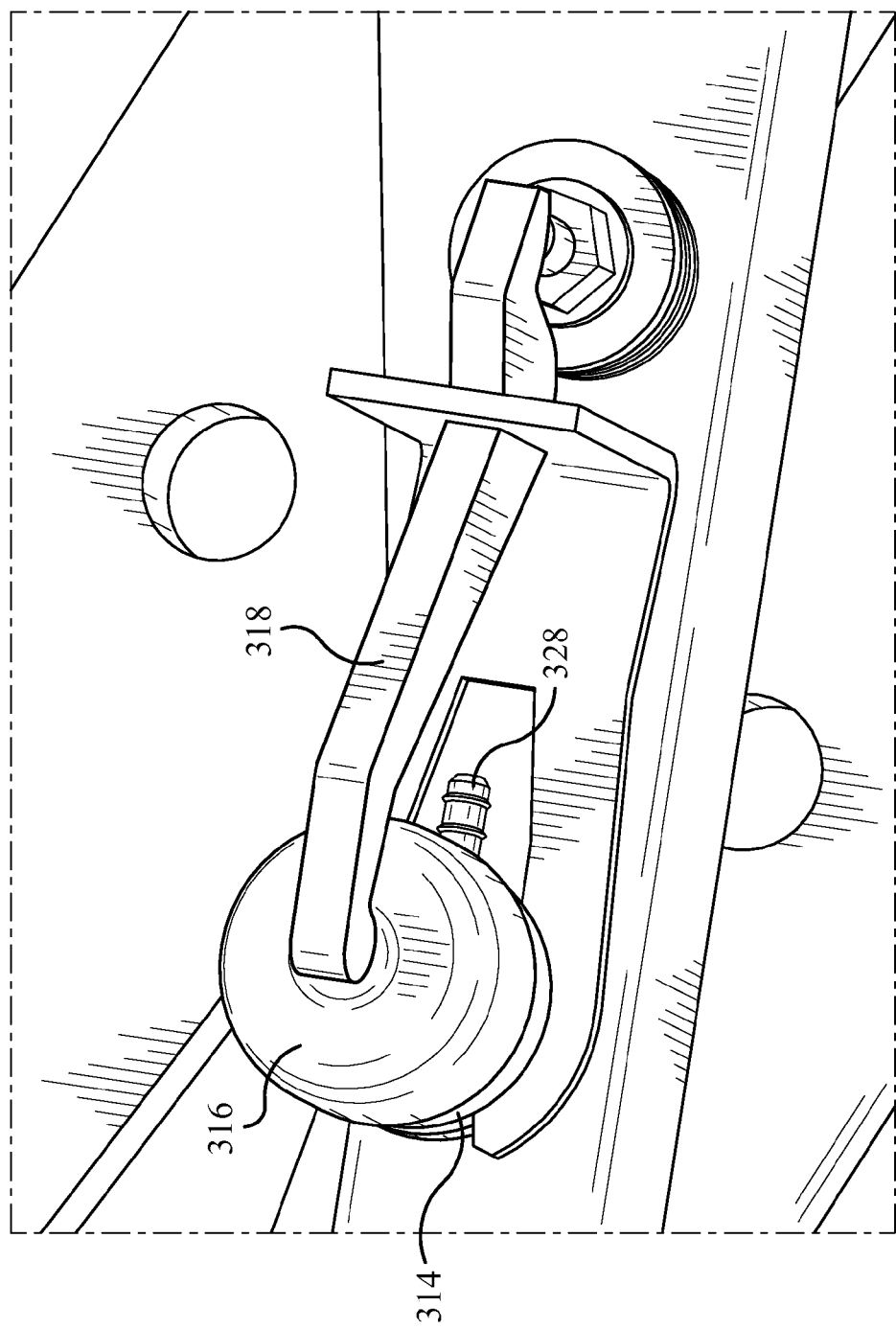

FIGS. 5 and 6 are close-up perspective views of the air cylinder 314, piston 316, and the pivot arm 318. A pneumatic connection valve 328 is attached to a side of the air cylinder 314 to facilitate the supply of air pressure upon request. Thus, an air source (not shown) can be connected to the air cylinder 314 via a hose or line.

Figure 7:
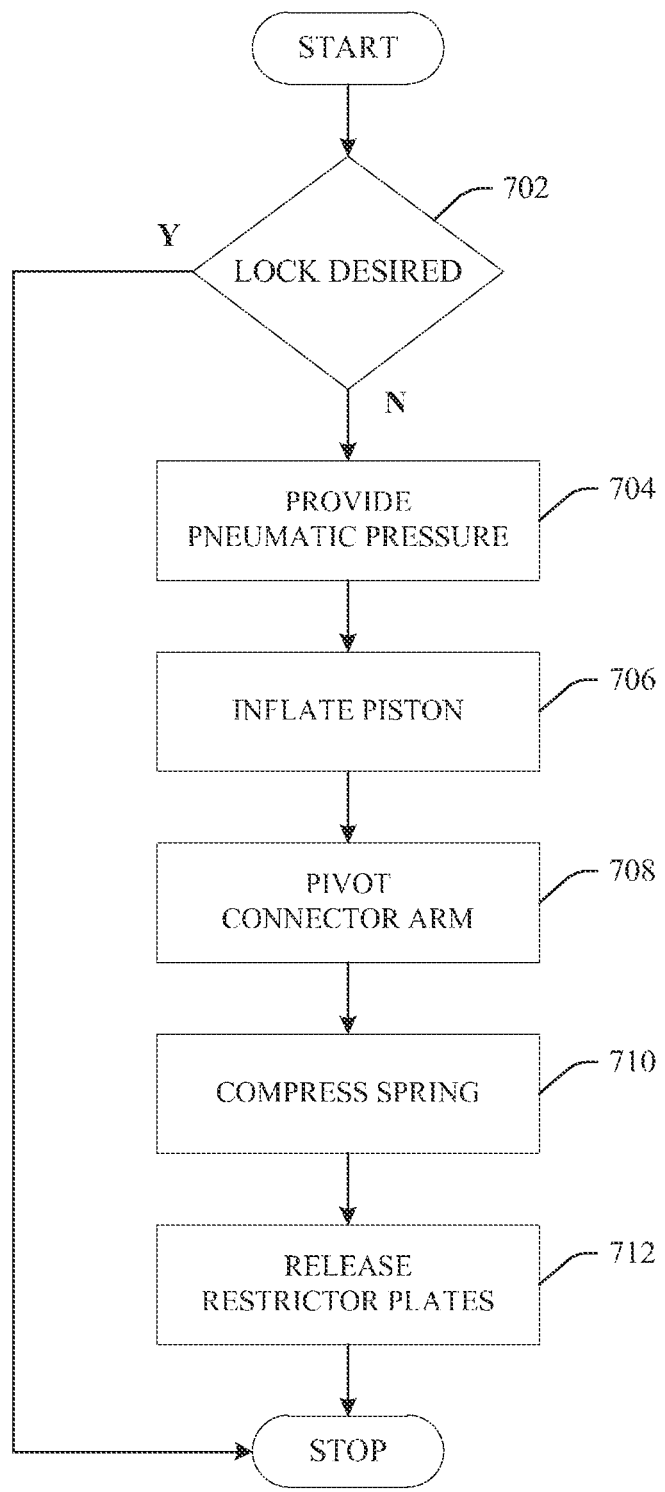
FIG. 7 illustrates an example flow chart of procedures that facilitate pneumatic vibration isolation in accordance with an aspect of the innovation.

FIG. 7 illustrates a methodology of isolating fore-aft vibrations using pneumatics in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 702, a determination if an isolation lock is desired is made. If a lock is desired, the vibration isolator lock system 100 remains intact and does not isolate the fore-aft vibrations. Thus, the restrictor plates 308 can effectively lock the isolator such that vibrations are not isolated. It is to be appreciated that if little pneumatic pressure is applied, some vibrations are restricted. If a lock is not desired, the method proceeds to 704 where pneumatic (or additional pneumatic) pressure is applied.

The air pressure can inflate the piston 316 at 706 thereby causing the pivot arm 318 to rotate about a point 326 at 708. The pivot arm 318 can compress the spring 312 at 710 which ultimately releases the restrictor plates 308 at 712 thereby allowing motion. Thus, the vibration isolator system 100 isolates fore/aft vibrations from the driver.

Conventionally, various types of mechanical latches and the like have been used to establish isolation lock. Contrary to conventional systems, the proposed system (e.g., system of FIG. 1) provides for pneumatic locking of the system, allowing additional flexibility in controlling the lock actuation. It is to be appreciated, however, that although the innovation described herein relates to pneumatic actuation, it is to be understood that the vibration isolator lock system can be actuated via other sources, such as but not limited to, hydraulics.

Additionally, as will be understood upon a review of the figures and description provided herein, the proposed system allows manual (or automatic) control of the air pressure. This provides the ability of the system to partially lock, thus giving the effect of a locked system, but allowing movement during a major fore/aft vibration event. In other words, the amount of air (e.g., pressure) can be regulated, thereby limiting some, but not all, of the fore/aft movements and vibration.

In other aspects, a user can pre-program a desired isolation pressure thereby the pressure can be auto-regulated (e.g., via a controller) to provide a desired effect. It will be understood that most any switching or programming system can be employed to regulate the pressure in the pneumatic isolation system of the innovation.

As described above, it is to be understood that the amount of pressure in the air cylinder will determine the unlock force. A partial lock, providing frictional damping of movements is possible by varying the air pressure. This feature is unique to this design and not employed in conventional systems. Additionally, although not shown, it is to be understood that an air source and activation means (e.g., switching means) are to be included within the scope of this specification.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A vibration isolation system for a seat assembly comprising:
    an air supply component;
    a vibration isolator component that receives air from the air supply component, the vibration isolator component including:
        a plurality of restrictor plates,
        a spring in communication with a plurality of restrictor plates; and
        a pneumatic piston mechanism communicating with the spring,
        wherein the plurality of restrictor plates restricts movement of a movable seat frame with respect to a fixed seat frame based on an amount of air pressure from the piston mechanism, and
        wherein a plurality of spacers are disposed between the plurality of restrictor plates,
        wherein when the pneumatic piston mechanism is not actuated, the spring is biased away from the plurality of restrictor plates such that the spring clamps the plurality of spacers to the plurality of restrictor plates thereby locking the restrictor plates.

2. The system of claim 1, wherein the vibration isolator component further includes:
    a first frame fixedly attached to a surface;
    a second frame that traverses in a same plane as the first-plate frame, wherein a seat assembly is attached to the second frame,
    wherein the plurality of restrictor plates restrict motion of the second frame with respect to the first frame based at least in part upon an amount of air pressure.

3. The system of claim 2, wherein the spring acts upon the plurality of restrictor plates to thereby lock the plurality of restrictor plates.

4. The system of claim 3, wherein when the plurality of restrictor plates are locked, the second frame and the first frame are fixed with respect to each other and vibration isolation is not provided to the seat assembly.

5. The system of claim 3, wherein the piston mechanism includes an air cylinder having a piston and a pivot arm that provides a communication between the piston and the spring.

6. The system of claim 3, wherein actuation of the piston mechanism compresses the spring thereby unlocking the plurality of restrictor plates.

7. The system of claim 4, wherein when the plurality of restrictor plates are unlocked, the second frame can move with respect to the first frame thereby providing vibration isolation to the seat assembly.

8. A vibration isolation lock device for a seat assembly comprising:
    a plurality of restrictor plates;
    a spring in communication with the plurality of restrictor plates; and
    a pneumatic piston mechanism communicating with the spring,
    wherein the plurality of restrictor plates restricts movement of a movable seat frame with respect to a fixed seat frame based on an amount of air pressure from the piston mechanism, wherein the pneumatic piston mechanism includes a pneumatic air cylinder having a piston and a pivot arm that provides a communication between the piston and the spring.

9. The device of claim 8, wherein the fixed seat frame is fixedly attached to a surface, wherein the movable frame traverses a same plane as the fixed frame, and wherein the seat assembly is attached to the movable frame.

10. The device of claim 9, wherein actuation of the piston mechanism compresses the spring thereby unlocking the plurality of restrictor plates.

11. The device of claim 10, wherein when the plurality of restrictor plates are unlocked, the movable frame can move with respect to the fixed frame thereby providing vibration isolation to the seat assembly.

12. The device of claim 9, wherein a plurality of spacers are disposed between the plurality of restrictor plates, wherein when the pneumatic piston mechanism is not actuated, the spring is biased away from the plurality of restrictor plates such that the spring clamps the plurality of spacers to the plurality of restrictor plates thereby locking the restrictor plates.

13. The device of claim 12, wherein when the plurality of restrictor plates are locked, the movable frame and the fixed frame are fixed with respect to each other and vibration isolation is not provided to the seat assembly.

14. The device of claim 13, wherein the air cylinder includes a pneumatic connector to facilitate the supply of air pressure to the air cylinder.

* * * * *